(12) United States Patent
Burdett et al.

(10) Patent No.: US 8,201,425 B2
(45) Date of Patent: Jun. 19, 2012

(54) HUB LOCK FOR MEDIA DISC STORAGE CONTAINER

(75) Inventors: Ronald K. Burdett, Strasburg, OH (US); Kevin Kirtz, Massillon, OH (US)

(73) Assignee: Autronic Plastics, Inc., Westbury, NY (US)

( * ) Notice: Subject to any disclaimer, the term of this patent is extended or adjusted under 35 U.S.C. 154(b) by 0 days.

(21) Appl. No.: 11/449,398

(22) Filed: Jun. 8, 2006

(65) Prior Publication Data

US 2007/0051644 A1 Mar. 8, 2007

Related U.S. Application Data

(60) Provisional application No. 60/688,863, filed on Jun. 8, 2005.

(51) Int. Cl.
*E05B 65/00* (2006.01)
(52) U.S. Cl. ........ 70/57.1; 70/58; 206/308.2; 292/307 A
(58) Field of Classification Search .............. 292/307 A; 70/57.1, 58; 206/308.1
See application file for complete search history.

(56) References Cited

U.S. PATENT DOCUMENTS

| | | | |
|---|---|---|---|
| 3,862,555 A | 1/1975 | Wirth |
| 3,927,765 A | 12/1975 | Beal |
| 4,425,999 A | 1/1984 | MacDonald et al. |
| 4,499,994 A | 2/1985 | Rentch |
| 4,502,598 A | 3/1985 | Wartenbergh |
| 4,516,678 A | 5/1985 | Fotiadis et al. |
| 4,523,356 A | 6/1985 | Charlot, Jr. |
| 4,635,797 A | 1/1987 | Bankier |
| 4,658,955 A | 4/1987 | Eichner |
| 4,670,950 A | 6/1987 | Wisecup et al. |
| 4,682,690 A | 7/1987 | Tiffany |
| 4,700,839 A | 10/1987 | Fujii |
| 4,709,813 A | 12/1987 | Wildt |
| 4,750,618 A | 6/1988 | Schubert |
| 4,805,769 A | 2/1989 | Soltis et al. |
| 4,819,797 A | 4/1989 | Holmgren |
| 4,834,238 A | 5/1989 | Hehn et al. |
| 4,874,085 A | 10/1989 | Grobecker et al. |
| 5,085,318 A | 2/1992 | Leverick |
| 5,320,219 A | 6/1994 | Ward |
| 5,363,962 A | 11/1994 | Toral et al. |
| 5,385,231 A | 1/1995 | Nowotny |
| 5,400,902 A | 3/1995 | Kaminski |
| 5,426,419 A | 6/1995 | Nguyen et al. |
| 5,462,159 A | 10/1995 | Roth et al. |

(Continued)

FOREIGN PATENT DOCUMENTS

DE 29722209 U1 2/1998

(Continued)

*Primary Examiner* — Kristina Fulton
(74) *Attorney, Agent, or Firm* — Zollinger & Burleson Ltd.

(57) ABSTRACT

A lock member includes a body having a lower surface below which a male lock pin projects in an orientation that allows it to be received in a female lock member. The lower surface is continuous, entirely surrounds, and is spaced from the lock pin. The spacing provides room to receive the upper portion of the disc retaining hub. The ring-shaped planar portion may rest directly against or closely adjacent the upper surface of a media disc. In one configuration, the ring-shaped planar portion spaces the lock pin from an EAS tag chamber. The configuration of the lock member increases the likelihood that the media disc will be damaged during a physical attack on the lock member.

18 Claims, 2 Drawing Sheets

U.S. PATENT DOCUMENTS

| | | | |
|---|---|---|---|
| 5,517,178 | A | 5/1996 | Rodrigues |
| 5,528,914 | A | 6/1996 | Nguyen et al. |
| 5,535,606 | A | 7/1996 | Nguyen et al. |
| 5,551,559 | A | 9/1996 | Roth et al. |
| 5,601,188 | A | 2/1997 | Dressen et al. |
| 5,782,350 | A | 7/1998 | Weisburn et al. |
| 5,829,582 | A | 11/1998 | Ippolito et al. |
| 5,894,924 | A | 4/1999 | Koch |
| 5,896,985 | A | 4/1999 | Nakasuji |
| 5,904,246 | A | 5/1999 | Weisburn et al. |
| 5,934,114 | A | 8/1999 | Weisburn et al. |
| 6,016,909 | A | 1/2000 | Chang |
| 6,065,593 | A | 5/2000 | Howerton et al. |
| 6,092,401 | A | 7/2000 | Sankey et al. |
| 6,102,200 | A | 8/2000 | Dressen et al. |
| D430,424 | S | 9/2000 | Belden et al. |
| 6,112,894 | A | 9/2000 | Kikuchi et al. |
| D436,435 | S | 1/2001 | Weinstock |
| 6,283,280 | B1 | 9/2001 | Wong et al. |
| 6,373,390 | B1 | 4/2002 | Hogan et al. |
| 6,382,413 | B1 | 5/2002 | Nakamura et al. |
| 6,435,343 | B1 | 8/2002 | Wu et al. |
| 6,474,117 | B2 * | 11/2002 | Okuno .......................... 70/57.1 |
| 6,516,945 | B2 * | 2/2003 | Myszka et al. ............. 206/308.2 |
| 6,675,961 | B2 | 1/2004 | Myszka et al. |
| 6,675,962 | B2 | 1/2004 | Myszka et al. |
| 6,675,963 | B2 | 1/2004 | Myszka et al. |
| 6,896,133 | B2 | 5/2005 | Spagna |
| 7,073,236 | B2 * | 7/2006 | Xue et al. ..................... 24/704.1 |
| 7,190,272 | B2 * | 3/2007 | Yang et al. .................. 340/572.8 |
| D546,660 | S | 7/2007 | Burdett et al. |
| 2002/0096442 | A1 | 7/2002 | Myszka et al. |
| 2002/0189961 | A1 | 12/2002 | Myszka et al. |
| 2003/0080007 | A1 | 5/2003 | Lau |
| 2004/0020802 | A1 | 2/2004 | Chang |
| 2005/0205442 | A1 | 9/2005 | Spagna |
| 2007/0090003 | A1 * | 4/2007 | Leesberg ................... 206/308.1 |

FOREIGN PATENT DOCUMENTS

| | | |
|---|---|---|
| FR | 6608564 | 6/1988 |
| FR | 2785439 | 5/2000 |
| NL | 1003965 | 3/1996 |
| WO | WO 2004/074611 A1 | 9/2004 |
| WO | WO 2004/093082 A1 | 10/2004 |
| WO | WO 2005/059919 A1 | 6/2005 |

* cited by examiner

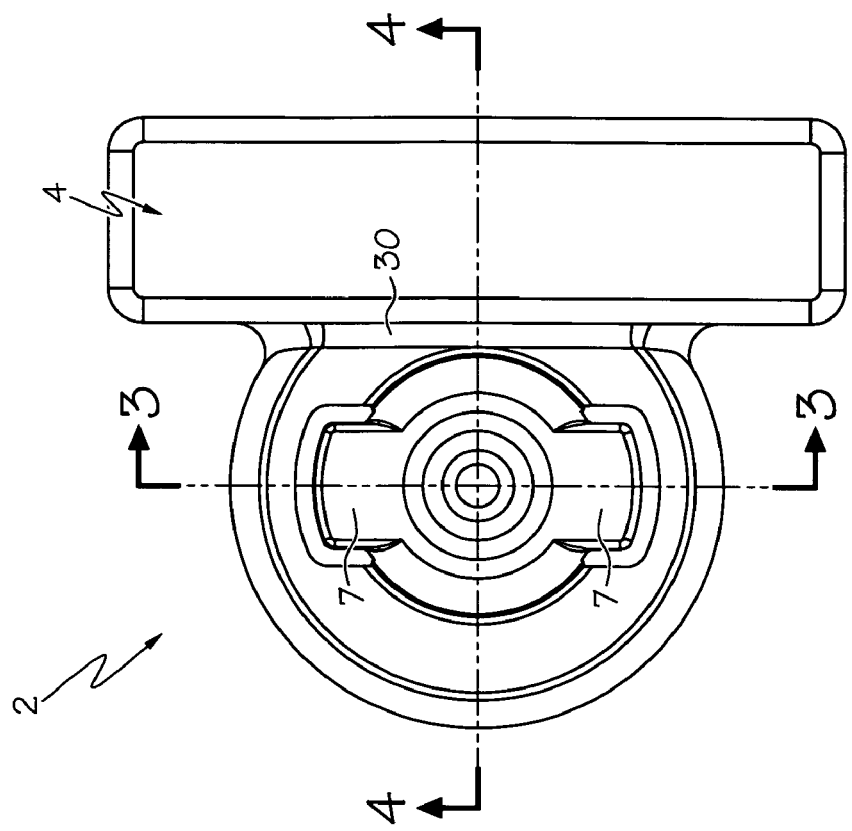
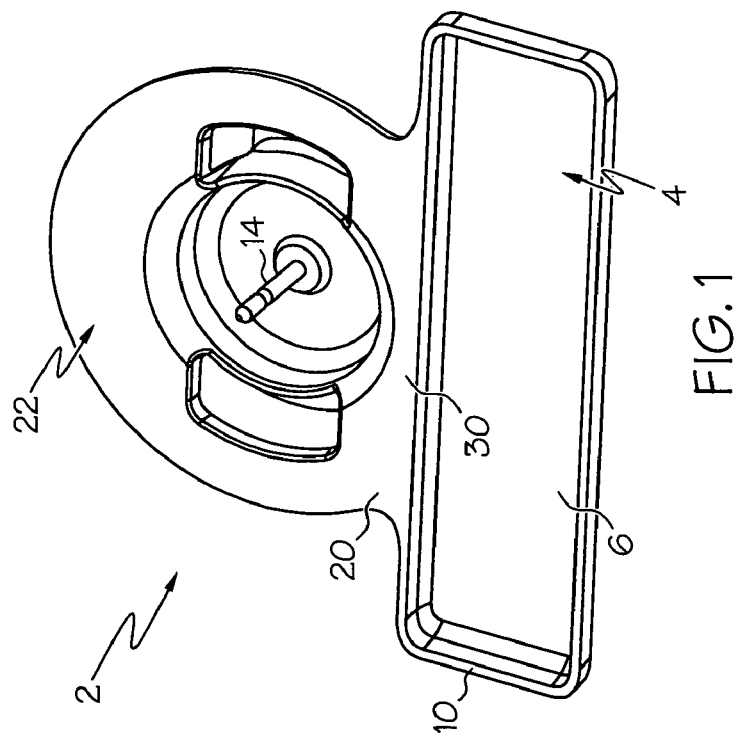
FIG. 1
FIG. 2

HUB LOCK FOR MEDIA DISC STORAGE CONTAINER

CROSS REFERENCE TO RELATED APPLICATIONS

This application claims priority from U.S. Provisional Patent Application 60/688,863 filed Jun. 8, 2005; the disclosure of which is incorporated herein by reference.

BACKGROUND OF THE INVENTION

1. Technical Field

The present invention generally relates to lockable media disc storage containers and, more particularly, to a lock used with a media disc storage container to lock the media disc on the hub of the container. Specifically, the present invention relates to the structure of a male locking element that defines a chamber adapted to receive an EAS tag.

2. Background Information

A wide variety of media security devices are known in the art. One type of media security device used with media discs is a lock that prevents a media disc from being removed from a retaining hub inside a media storage container. A retail facility using media security devices typically places an electronic article surveillance tag (EAS tag) in each media storage container and then secures the item of recorded media within the media storage container. A drawback with this system is that the media storage container cannot pass through the sensor zone located at the exit to the facility without triggering the store alarm. One solution has been to keep all of the recorded media storage containers behind the checkout counter and display empty boxes for the customer to review. Hub locks are desirable because they secure the items of recorded media against theft so that the items can be left out for display and review by the customer. Separate storage facilities and duplicate media storage containers behind the checkout counter are not needed. Hub locks are also desirable because a shoplifter will likely damage the article of recorded media while trying to defeat the lock.

BRIEF SUMMARY OF THE INVENTION

The invention provides a hub lock that carries an EAS tag so that a media storage container is armed for detection for an anti-shoplifting system when the hub lock is locking a media disc within a media storage container. The system is unalarmed when the hub lock is removed from the container so that the customer may take the storage container once the hub lock has been removed. The invention also provides a media security system incorporating such a hub lock.

In one configuration, the invention provides a hub lock having a male lock member that is adapted to lockingly cooperate with a female lock member that is disposed under or within a disc retaining hub. In this configuration, the hub lock has a flat continuous surface that surrounds the male lock member to separate the male lock member from an EAS tag chamber configured to securely receive an EAS tag in a position that places the media disc at risk if a shoplifter attempts to remove the EAS tag from the chamber.

In one configuration, the invention provides a hub lock having an EAS tag holder that is connected to the body of the hub lock with a neck that is adapted to prevent the shoplifter from using the EAS tag holder as leverage for attacking the lock.

In another configuration, the EAS tag holder has a perimeter wall that entirely surrounds the EAS chamber to separate the EAS tag chamber from the lock pin such that the lock pin cannot be attacked through the EAS tag chamber. The perimeter wall may have a lower surface adapted to engage the upper surface of the media disc to increase the risk of harming the media disc if one attacks the EAS tag holder with a pry bar.

BRIEF DESCRIPTION OF THE SEVERAL VIEWS OF THE DRAWINGS

FIG. 1 is a perspective view showing the bottom of the hub lock.

FIG. 2 is a top plan view of the hub lock.

Similar numbers refer to similar parts throughout the specification.

DETAILED DESCRIPTION OF THE INVENTION

Figure 3:
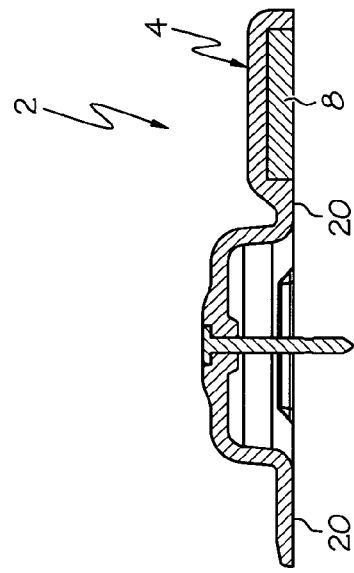
FIG. 3 is a section view taken along line 3-3 of FIG. 2.

One exemplary configuration of a hub lock is indicated generally by the numeral 2 in the accompanying drawings. Hub lock 2 is part of a media security system that includes a media storage container having a retaining hub 13 that is used to hold a disc-shaped item of recorded media 12 within the storage container. Hub 13 may be any of a variety of disc retaining hubs known to those skilled in the art. Hub lock 2 reversibly lockingly connects with a second lock member 15 that is typically disposed under or within hub 13. In the exemplary embodiment of the invention, hub lock 2 includes a male lock member 14 in the form of a metal lock pin that is securely lockingly received by a biased clutch having ball bearings that pinch member 14 to prevent member 14 from being withdrawn from the clutch. Hub lock 2 is configured to rest directly against the upper surface of item 12 when hub lock 2 is locked in position.

Hub lock 2 includes an electronic article surveillance (EAS) tag holder 4 that defines an EAS tag chamber 6 adapted to receive an EAS tag 8. In the exemplary configuration of the invention, the longitudinal dimension of holder 4 is disposed parallel to a reference line that bisects the wings 7 that are used to grip hub lock 2 when hub lock 2 is being removed from hub 13. The parallel configuration of holder 4 does not interfere with the operation of the gripper that engages wings 7 to remove hub lock 2 from hub 13. Holder 4 also may be positioned in a non-parallel relationship to the reference line as long as holder 4 does not interfere with the mechanism that engages wings 7 to remove hub lock 2 from hub 13.

Figure 4:
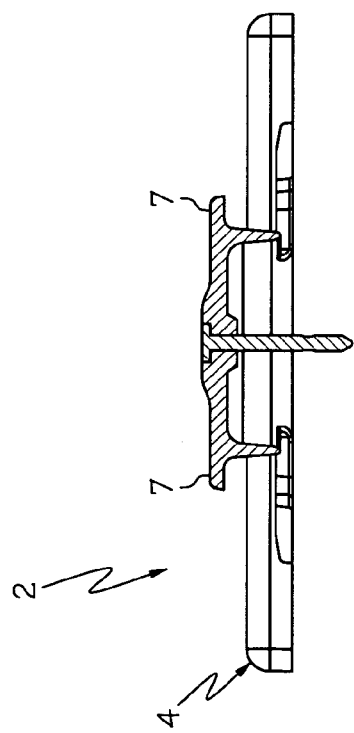
FIG. 4 is a section view taken along line 4-4 of FIG. 2.
Figure 5:
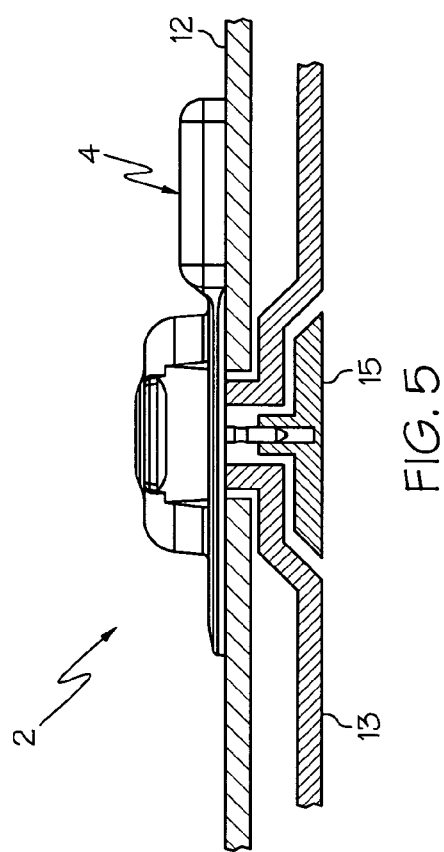
FIG. 5 is a side view of the hub lock system of the invention securing a media disc to a retaining hub.

Holder 4 may have a height that is less than the height of the body of hub lock 2 so that holder 4 does not interfere with the engagement of the key with hub lock 2. The overall height of holder 4 is less than 60 percent of the overall height of lock 2. Chamber 6 is designed to be slightly larger than the type of EAS tag that will be used with hub lock 2. This configuration minimizes areas where an attacker may try to insert a tool between the inner surface of holder 4 and tag 8 as shown in FIG. 4.

A perimeter wall 10 extends entirely around chamber 6. The planar lower surface of wall 10 is adapted to be disposed against or slightly above the upper surface of a media disc 12 when hub lock 2 is locked to a media storage container such as that described in PCT/US2004/041470, the disclosures of which are incorporated herein by reference. Wall 10 thus makes it difficult for a shoplifter to pry holder 4 upwardly to expose EAS tag 8 for attack without placing the integrity of media disc 12 at risk. Wall 10 also separates chamber 6 from the lock pin 14 so that pin 14 cannot be easily attacked through chamber 6.

A flat continuous lower surface 20 of hub lock body 22 completely surrounds pin 14 with a portion of the broad flat lower surface 20 disposed immediately between pin 14 and chamber 6. Lower surface is continuous because it extends entirely around lock member 14. Surface 20 defines openings aligned with wings 7 and has different radial widths as measured radially from lock member 14. In the exemplary embodiment, a portion of the radial outer edge is rounded. Lower surface 20 provides stability to the system when hub lock 2 is locked in place and provides a broad surface to engage the media disc. Surface 22 may be provided in a variety of geometric shapes when view in a bottom plan view. Surface 22 spaces chamber 6 from the concave hub-receiving portion of lock body 22 by at least one thickness of wall 10. An exemplary spacing embodiment of at least three wall thicknesses is depicted in FIG. 4.

Another feature of hub lock 2 is that holder 4 may be connected to body 22 at a thin, narrowed neck 30 as shown in the drawings. The length of neck is shorter than the length of holder 4 and shorter than the outer diameter of body 22. Neck 30 may be designed to break in a situation wherein the shoplifter attempts to attack the locked engagement of hub lock 2 with a female lock member 32 such that the shoplifter loses any leverage provided by holder 4. Although breaking the neck will removed the EAS tag from the hub lock 2, the shoplifter still has the problem of removing the hub lock 2 without damaging the media disc 12. In addition, the breaking of neck 30 may damage media disc 12.

In an alternative configuration, neck 30 has a length equal to the outer diameter of body 22 and may be strengthened with ribs so prevent the shoplifter from prying holder 4 upwardly away from disc 12 and to make it difficult to break holder 4 from body 22.

The upper corners of holder 4 and body 22 are rounded to help ward off attacks.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A hub lock that is adapted to cooperate with a secondary lock member to lock a media disc to a disc retaining hub within a media storage container; the hub lock comprising:
    a body having an upper surface and a lower surface wherein the lower surface is opposite the upper surface and defines an underside of the body for directly engaging the media disc that is being locked to the disc retaining hub by the hub lock and secondary lock member;
    a lock member carried by and extending downwardly from the body beyond the lower surface of the body; the lock member extending downwardly from the body at a location spaced from the lower surface of the body; the lock member adapted to be locked to the secondary lock member to secure the hub lock to the secondary lock member;
    a portion of the lower surface of the body being a continuous lower surface that extends entirely around the lock member; and
    the body also defining an EAS tag holder; the EAS tag holder defining an EAS tag chamber and an EAS tag chamber opening adapted to allow the EAS tag to be inserted into and removed from the EAS tag chamber; the EAS tag chamber opening opens to the media disc when the hub lock is locking the media disc to the disc retaining hub to limit access to the EAS tag chamber opening; a portion of the continuous lower surface being disposed directly between the lock member and the EAS tag chamber opening to separate the EAS tag chamber opening from the lock member.

2. The hub lock of claim 1, further comprising at least one wing projecting outwardly from the body over a portion of the continuous lower surface of the body; the continuous lower surface of the body defining a through hole aligned downwardly from the wing.

3. The hub lock of claim 1, further comprising a pair of diametrically opposed wings projecting outwardly from the body; the EAS tag holder having a longitudinal dimension disposed parallel to a reference line bisecting both of the wings.

4. The hub lock of claim 1, wherein the body has a height above the lower surface of the body; the EAS tag holder having a height; the height of the EAS tag holder being less than the height of the body.

5. The hub lock of claim 4, wherein the EAS tag holder has a lower surface that is coplanar with the lower surface of the body.

6. The hub lock of claim 1, wherein the EAS tag holder is connected to the body with a neck; the body having an outer dimension; the width of the neck being less than the outer dimension of the body.

7. A hub lock that is adapted to cooperate with a secondary lock member to lock a media disc to a disc retaining hub within a media storage container; the hub lock comprising:
    a body defining a concave recess adapted to receive a portion of the disc retaining hub when the hub lock is locking a media disc to the disc retaining hub;
    an elongated male lock member extending downward from the body and adapted to pass through the disc retaining hub that holds the media disc and lockingly engage the secondary lock member; a portion of the elongated male lock member disposed in the concave recess;
    an EAS tag holder connected to the body;
    the EAS tag holder defining an EAS tag chamber and an EAS tag chamber opening adapted to allow the EAS tag to be inserted into and removed from the EAS tag chamber; the EAS tag chamber opening opens to the media disc when the hub lock is locking the media disc to the disc retaining hub to limit access to the EAS tag chamber opening;
    the EAS tag holder having an outer wall that surrounds the EAS tag chamber; and
    the EAS tag chamber being separated from the concave recess by at least a portion of the outer wall of the EAS tag holder such that the outer wall of the EAS tag holder is disposed between the EAS tag chamber and a portion of the elongated male lock member.

8. The hub lock of claim 7, further comprising at least one wing projecting outwardly from the body above another portion of the body; the body defining a through hole aligned downwardly from the wing.

9. The hub lock of claim 8, further comprising a pair of diametrically opposed wings projecting outwardly from the body; the EAS tag holder having a longitudinal dimension disposed parallel to a reference line bisecting both of the wings.

10. The hub lock of claim 7, wherein the body has a lower surface and a height above the lower surface of the body; the EAS tag holder having a height; the height of the EAS tag holder being less than the height of the body.

11. The hub lock of claim 10, wherein the EAS tag holder has a lower surface that is coplanar with the lower surface of the body.

12. The hub lock of claim 7, wherein the EAS tag holder is connected to the body with a neck; the body having an outer dimension; the width of the neck being less than the outer dimension of the body.

13. A hub lock that is adapted to cooperate with a secondary lock member to lock a media disc to a disc retaining hub within a media storage container; the hub lock comprising:

a body having an upper surface and a lower surface wherein the lower surface is opposite the upper surface and defines an underside of the body for directly engaging the media disc that is being locked to the disc retaining hub by the hub lock and secondary lock member;

a lock member carried by and extending downwardly from the body; the lock member extending downwardly from the body at a location spaced from the lower surface of the body; the lock member adapted to be locked to the secondary lock member to secure the hub lock to the secondary lock member; and the body defining an EAS tag holder; the EAS tag holder defining an EAS tag chamber and an EAS tag chamber opening adapted to allow the EAS tag to be inserted into and removed from the EAS tag chamber; the EAS tag chamber opening opens to the media disc when the hub lock is locking the media disc to the disc retaining hub to limit access to the EAS tag chamber opening.

14. The hub lock of claim 13, wherein the body defines a concave recess disposed about a portion of the elongated male lock member; the EAS tag chamber being separate from the concave recess.

15. The hub lock of claim 13, wherein a hub lock height is defined between the upper surface and the lower surface of the body; the EAS tag holder having a height; the height of the EAS tag holder being less than the hub lock height.

16. The hub lock of claim 13, wherein the EAS tag holder has a lower surface that is coplanar with the lower surface of the body.

17. The hub lock of claim 13, wherein the EAS tag holder is connected to the body with a neck; the body having an outer dimension; the width of the neck being less than the outer dimension of the body.

18. The hub lock of claim 13, further comprising at least one wing projecting outwardly from the body and the body defining a through hole aligned downwardly from the wing.

* * * * *